INVENTOR.
PAUL BECKMAN

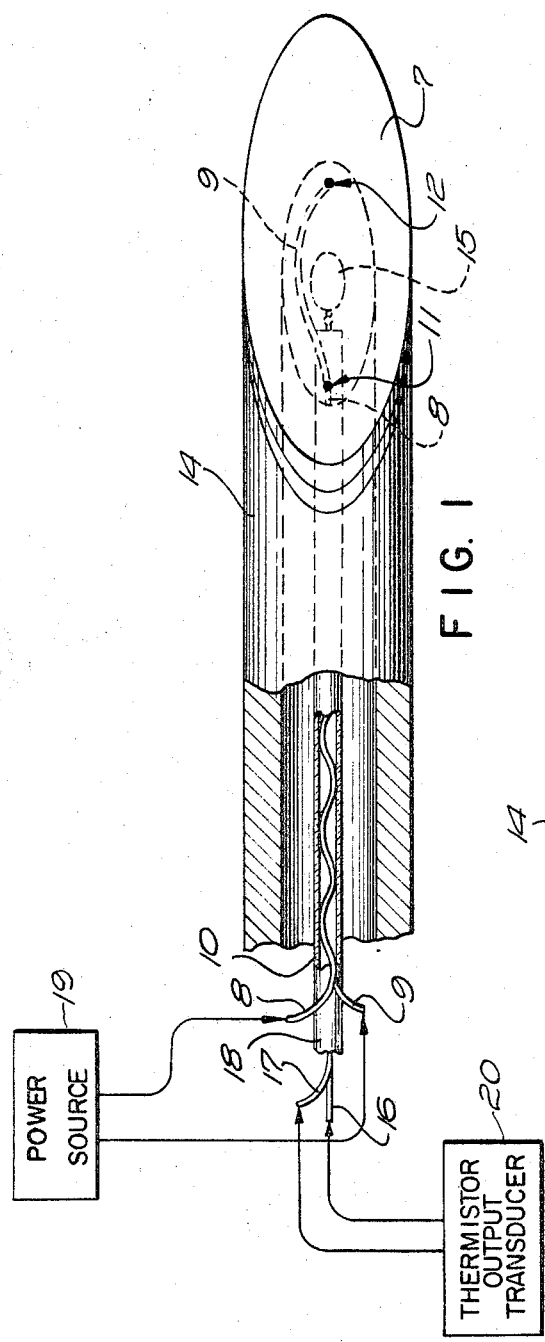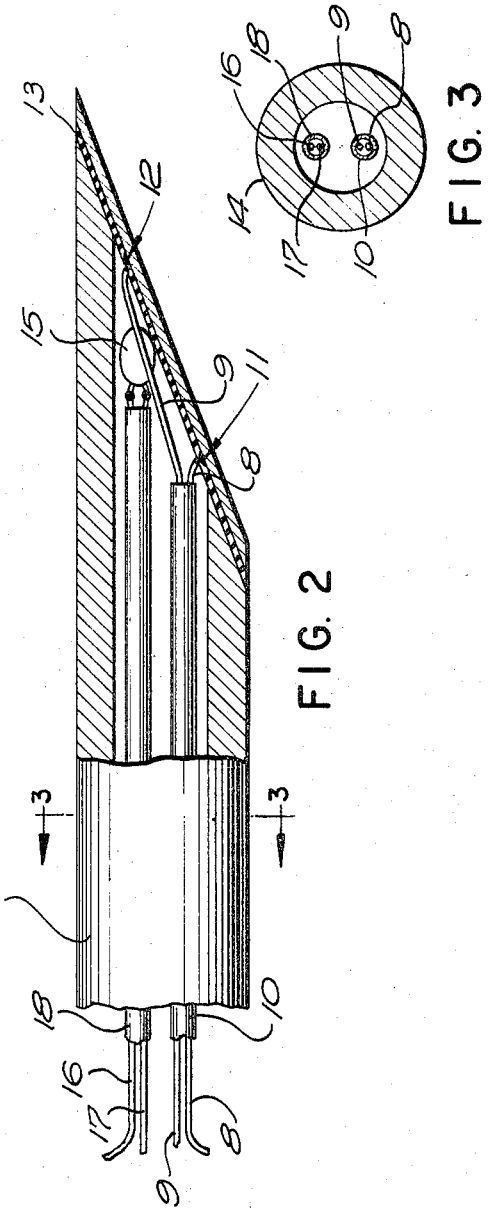
INVENTOR.
PAUL BECKMAN

United States Patent Office 3,435,400
Patented Mar. 25, 1969

3,435,400
THERMAL PROBE
Paul Beckman, 944 Henrietta Ave.,
Huntingdon Valley, Pa. 19006
Filed Jan. 26, 1966, Ser. No. 523,196
Int. Cl. H01c 7/04
U.S. Cl. 338—28                                    7 Claims

ABSTRACT OF THE DISCLOSURE

A miniature thermal probe is formed by a small-diameter tube having its tip closed by an electrically and thermally isolated metallic membrane which develops localized $I^2R$ heating effects as the result of currents forced across it via spaced internal electrical contacts; a minute thermistor is disposed within the tube in close proximity with the heater membrane and is connected in an independent electrical output circuit.

---

The present invention relates to improvements in the determination of physical phenomena by means of thermally-induced effects, and in one particular aspect, to unique and improved electrical apparatus lending itself to microminiaturization for purposes of highly precise measurement of fluid flow velocity, such as blood flow in animal and man, and of level and flow of liquid or gaseous fluids.

It has been known heretofore that conditions such as those of fluid flow and level may be investigated by means of a technique involving the release of heat at one site and detection of resulting temperature changes at another in the same fluid environment. The relative positions of a heat source and detector can be critical, and, in some cases it is difficult and undesirable to introduce two measurement devices into the vessel, line or body wherein the investigations are to be made. The problems involved with measurements on living tissues and organisms are of course greatly intensified, and it becomes important that the devices used be of extremely small sizes. In accordance with the present teachings, probes useful for such purposes are of unique construction involving, as an integral single-unit heating and sensing device, a fully-closed miniature tube having near its tip a thin metallic closure membrane which is itself heated as the result of flow of electrical current thereacross and which contains a temperature-sensing unit sealed inside the tube at a site near the membrane where it responds to the conductions of heat away from the membrane by an external fluid medium.

It is one of the objects of the present invention, therefore, to provide novel and improved apparatus of uncomplicated miniaturized construction which will accurately generate and sense heat at a highly localized site.

Another object is to provide a unique versatile sealed probe, of needle-like form and proportions, which is capable of releasing and/or sensing heat at substantially one small point at or near its tip and which further lends itself to use as an electrical sensing or stimulating electrode.

A further object is to provide a self-contained integral hypodermic-type probe, suitable for biological investigations and the like, which is of a sealed non-coring construction and which uniquely combines both heat radiating and detecting elements in a single unitary assembly.

Still further, it is an object to provide a miniature probe, for measurements of fluid velocity, fluid level, and the like, of low-cost uncomplicated construction involving a thin isolated heater membrane in close proximity with a temperature sensor sealed within the probe by the membrane.

By way of a summary account of practice of this invention in one of its aspects, a small-diameter steel tube has a tip opening closed by a thin metallic membrane which is capable of developing a substantial $I^2R$ heating effect as the result of currents forced across it via its spaced internal electrical connections with insulated supply wires disposed within the tube. An insulating bonding material, such as an epoxy resin, secures the membrane in the desired closing and sealing relationship with the tip opening, and at the same time provides desirable thermal and electrical isolations. Within the tube, and in very close proximity with the heater membrane, is a minute thermistor bead, the electrical connections of which are brought through the tube to an external electrical measuring device or transducer via insulated wiring.

Although the features of this invention which are believed to be novel are expressed in the appended claims, further details as to preferred practices of the invention, as well as the further objects and advantages thereof, may be most readily comprehended through reference to the following description taken in connection with the accompanying drawings, wherein:

FIGURE 1 is a partly cross-sectioned view of the tip of an improved thermal probe, in greatly magnified dimensions, together with associated block-diagrammed electrical equipment;

FIGURE 2 is a partly cross-sectioned elevational view of the same probe;

FIGURE 3 is a transverse cross-section of the probe, taken along section lines 3—3 in FIGURE 2, showing insulator tubes for leads within the probe barrel;

Figure 4:
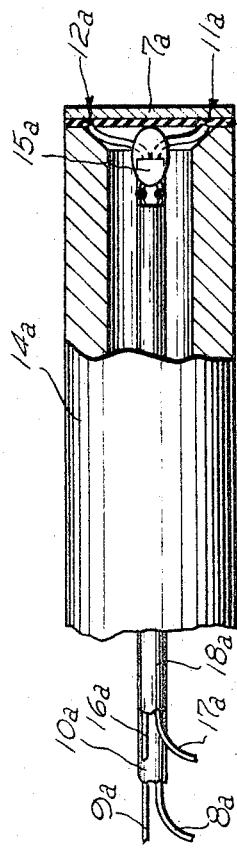
FIGURE 4 illustrates the tip of a similar probe, partly cross-sectioned, in which the heater membrane is disposed transversely in relation to the elongated probe.

In a preferred embodiment of the invention as disclosed in FIGURES 1–3, there are provided a member 7 consisting of a thin homogeneous metallic membrane, preferably of platinum or a platinum-iridium alloy, having a known temperature coefficient of resistance and which can function repeatedly and without degradation as a resistance heater. The surface area-to-cross section of such a membrane is extremely large, so that excellent heat transfer is realized at the surface of this thin-film metallic member.

Membrane 7 is attached to two fine resistance wires 8 and 9 which are disposed throughout their full effective length in slack form (FIGURE 1) in different ones of two bores running axially parallel in a double-bore quartz insulator tube 10. These two wires are electrically and mechanically connected to the metallic membrane 7 at maximum permissible spaced-apart positions 11 and 12, so that a maximum resistance value may be realized therebetween. The membrane is peripherally bonded with the bevelled face of a normal stainless steel (No. 23 or No. 25 gage) hypodermic needle, the intervening electrically-insulating bonding material 13 providing electrical isolation from the main needle probe or barrel 14.

Excess overhanging material of this metallic membrane is cut away so that the desired precise shape of the bevelled section of the needle or barrel is not destroyed. A miniature thermistor bead 15 of known type, approximately .005 inch diameter and preferably not exceeding .010 inch diameter, is placed as near as possible to the thin film of insulation material 13 which also covers interior surfaces of the heater membrane. The thermistor bead is connected to wires 16 and 17 conveniently disposed throughout their full effective length in slack condition in different ones of two bores of a double-bore quartz tube 18, these wires being welded or otherwise suitably joined electrically and mechanically with the leads from the thermistor bead. It should be evident to those versed in the art that the illustrated thermistor bead may be replaced by temperature-sensing means such as a thermocouple element, a series of thermocouple elements, or a resistance thermometer. The temperature-sensitive bead serves as a precise temperature detector in very close proximity to a broad-area heater element, the latter being disposed to be in highly efficient heat-transfer relationship with an external medium.

In fully appreciating the significance of my invention, it is helpful to understand that membrane 7 does not serve as a hot wire anemometer in the classic sense; rather, it serves as a heat-transfer membrane that heats and cools with extreme rapidity and efficiency, so that any resulting temperature difference can be detected quickly by the temperature detector 15. The probe tip shown in FIGURES 1 and 2 is many times larger than a preferred actual size for many purposes, and in one embodiment it is as small as a common medical needle and useful as a means of entering animal physiognomy for purposes of applying highly localized heat and/or making temperature-related measurements.

Members 10 and 18 each typically have an outside diameter of only 0.003 inch and not more than 0.005 inch and contain two holes approximately .0012 inch in diameter so that slack wires (8, 9, 16 and 17) of .001 inch diameter or less may be employed while remaining spaced apart by electrically insulating wall material of the tubes.

As a result of the aforedescribed construction, the improved thermal apparatus offers the advantage of being completely sealed to the environment in which it functions; the thermally- and electrically-conductive membrane enables a slight heating or cooling change to be detected without appreciable lag by the physically isolated and yet closely aligned temperature detector 15. It can be seen that the resulting construction lends itself to expression in such a minute size that any disturbances of a fluid velocity pattern at the site of the probe tip may be instantly detected. Because the temperature sensor 15 is in such extreme proximity to the thin film heater membrane 7, thermal lags are exceedingly small and its responses to temperature changes are extremely rapid. Furthermore, the arrangement is further advantageous in that the sensor wires 16 and 17 are allowed to remain in a slack condition, rather than being restrained by conventional methods of electrical insulation which would tend to alter their characteristics and impose unwanted strains.

The probe may be used for constant monitoring of fluid and tissue conditions during surgical procedures, so that critical levels of anesthesia can be accurately controlled, for example. Blood flow may be measured directly in large veins and arteries, based upon related knowledge of the inside diameter of the veins or arteries, so that volume flow can be readily calculated or charted. Versatility of the apparatus is illustrated by the following applications: independent measurement of local in situ temperature; use of the probe as a controlled source of concentrated heat, occurring only at its tip; operation of the isolated membrane element as a recording or stimulating biological electrode; and use of the probe as an extremely sensitive and fast-responding liquid level sensor or for making localized ultra-high frequency and radiation field measurements.

In one convenient fabricating process, the slender tube or hollow needle 14 has its tip cut diagonally into the illustrated bevelled form which renders it better suited to insertions through materials such as animal tissue, and the double-bore quartz tubes 10 and 18 containing the wire pairs 8, 9 and 16, 17 are disposed axially within the tube such that their ends are close to but do not project beyond the plane of the bevelled end of the needle. Excitation wires 8 and 9 are welded or otherwise conductively and mechanically secured to one side of the metallic membrane 7 at positions 11 and 12 as widely spaced as possible, taking into account that these wires should not contact the interior of the steel tube 14 when the parts are assembled as illustrated. The membrane is then forced close to the bevelled end of the tube, and the insulating bonding resin material, 13, is inserted therebetween. One suitable material is an epoxy resin sold under the name "Mithra" by Mithra Corporation, California, having good bonding and electrical and thermal insulation characteristics. Once the relatively thick resin material has been put in place, a heating tool is applied against the outside of the membrane, causing it to soften the resin initially and then to cure it in a thin bonding layer some of which is spread across the inside of the membrane and bonds the thermistor bead 15 therewith in a predetermined closely-spaced insulated relationship, as shown in FIGURE 2. The latter fact is desirable in preserving a fixed heat-transfer relationship between the temperature-sensor 15 and thin-foil heater 7. Excess bonding material is trimmed away, leaving a smooth-surfaced non-coring type needle assembly.

The tubular needle or barrel section 14 may be made of an appropriate length for the intended purposes, typically one-fourth to six inches. As the end opposite the sensitive tip, the needle is preferably rigidly joined and sealed with a connector (not illustrated) such as an externally-threaded hollow connector member containing a glass insulating support-and-seal member in which are mounted four gold-plated pin terminals for the wires 8, 9, 16 and 17. This sealed unit may be autoclaved according to normal procedure. The aforementioned type of connector may be mated with another containing four insulated pin receptacles electrically coupled with the wires of a four-conductor shielded cable, a female threaded collar serving to secure the cooperating connector units together. As is shown in FIGURE 1, an electrical power source 19 is coupled with the wires 8 and 9 which carry heat-inducing currents to the membrane 7. Typically, the heater membrane resistance may be about 25 ohms, the source 19 comprising a five-volt supply. A dissipation constant of about 200-milliwatts per degree centrigrade is realized when the probe is immersed in water at 25° C. flowing with a velocity of 100 mm./sec. The thermistor bead 15 may typically have a resistance of about 10,000 ohms at 25° C. and a temperature coefficient of resistance (0° C.–50° C.) of about 3.9%/° C. Conveniently, the thermistor output transducer 20 (FIGURE 1), coupled with the thermistor-connected wires 16 and 17, may comprise a conventional type of bridge, three legs of which are known impedances and the fourth of which consists essentially of the thermistor impedance. The transducer then further includes a voltage source connected across the bridge diagonal input terminals and a measurement device such as a D'Arsonval-movement instrument or recorder connected across the bridge diagonal output terminals for displays related to the sensed temperatures. Other instrumentation may of course be substituted and may be suitably calibrated to exhibit the measured characteristics. In one use of the described apparatus, the probe is immersed in a flowing medium and the temperature $T_1$ is measured with zero power input to the heater membrane. A constant power input is then applied to the heater, causing the measured temperature to rise to temperature $T_2$. The temperature $T_2$ will vary with small changes in fluid flow, due to the attendant variations in the amounts of thermal energy released to the medium per unit of time by the external relatively broad-area surface of the membrane 7, and the temperature differences $(T_2-T_1)$ thus characterize changes in flow conditions and can provide absolute rate measurements. The insulated membrane 7 may alternatively be electrically energized to provide a stimulating impulse, at a voltage level different from that of tube 14, or may merely be heated to develop a desired highly-localized temperature. Thermistor 15 can serve as a simple local temperature detector if that is desirable. In another important use, the membrane 7 may itself be used as a resistance-temperature detector, independently of any other heat sensor element.

Figure 5:
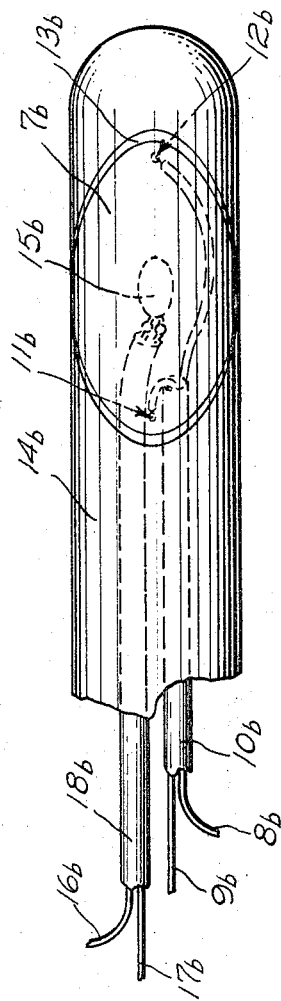
FIGURE 5 depicts a further modification in which the heating and detecting elements are disposed along the side of a probe.
Figure 6:
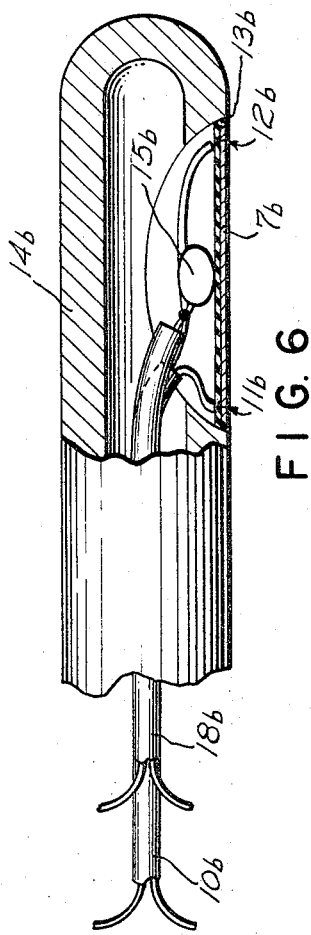
FIGURE 6 is an elevational view of the probe of FIGURE 5, with the interior construction exposed by a partial cross-section.

The assembly depicted in FIGURE 4 is generally similar to that described in connection with the illustrations in FIGURES 1–3, except that the probe tip is not bevelled and the heater membrane extends substantially transversely to the longitudinal axis of the probe, as shown. The same reference characters, with the distinguishing subscript *a*, are thus used to designate elements which correspond to those of the earlier figures. In the further modification appearing in FIGURES 5 and 6, the distinguishing subscript *b* is used, the probe being closed at its tip and having the membrane 7*b* along the side of the barrel 14*b* in sealed relationship with an opening through the sidewall of the barrel. These alternative types of probes may conveniently be in somewhat larger than hypodermic-needle sizes. Those skilled in the art will appreciate that the probe tubes may be made of a variety of materials, not necessarily metallic material if the intended applications permit it, and that the illustrated thermistor bead may be replaced by another convenient form of temperature detector such as a thermoelectric element or elements. Accordingly, it should be understood that the embodiments and practices described and portrayed have been presented by way of disclosure, rather than limitation, and that various modifications, substitutions and combinations may be effected without departure from the spirit and scope of this invention in its broader aspects.

What I claim as new and desire to secure by Letters Patent of the United States is:

1. A thermal probe comprising a thin fluid-tight tube having an opening substantially at a tip end thereof, said tube being of metallic material and substantially rigid, a thin membrane of substantially homogeneous metallic electrical resistance material having a relatively large ratio of surface area to cross section, means sealing said membrane with said tube in closing relationship to the opening therethrough, said means sealing said membrane with said tube comprising electrically-insulating bonding material, means for forcing electrical current along said membrane and generating heat as the result of electrical power losses therethrough, said means for forcing electrical currents along said membrane including two electrical conductors electrically and mechanically secured to the interior surface of said membrane at spaced positions therealong, electrical heat-sensor means, and means mounting said heat-sensor means within said tube in close proximity with said membrane, whereby characteristics of a fluid medium exposed to the exterior of said membrane are related to electrical characteristics of said heat-sensor means.

2. A thermal probe as set forth in claim 1 wherein said rigid tube is substantially straight and cylindrical and has an external diameter of the order of hypodermic-needle diameters, and wherein said tip end of said tube closed by said membrane is bevelled to form a non-coring piercing end.

3. A thermal probe as set forth in claim 2 wherein said rigid tube is formed of stainless steel, and wherein said membrane material includes platinum.

4. A thermal probe as set forth in claim 3 wherein said electrically-insulating bonding material comprises a heat-cured resin material, and further including collinearly within said tube quartz tubing having spaced longitudinal openings therethrough, and a plurality of electrical conductors, including said two electrical conductors, each extending through a different one of said openings in a slack condition and having an external diameter less than the internal diameter of the opening through which it extends, wherein said heat-sensor means comprises a thermistor bead, means securing said thermistor bead in closely-spaced electrically-insulated relationship with the interior surface of said membrane, said conductors being in electrical circuit connections with said thermistor bead and membrane.

5. A thermal probe as set forth in claim 1 wherein said electrical conductors are each welded with said membrane at a different one of said spaced-apart positions, and electrically-insulating bonding material securing said heat-sensor means within said tube in closely-spaced relationship with the interior surface of said membrane at a position between said space-apart positions.

6. A thermal probe as set forth in claim 4 wherein said quartz-tubing comprises a pair of quartz tubes extending longitudinally within said tube and each having a pair of said openings therein parallel with one another.

7. A thermal probe comprising a thin fluid-tight tube having an opening substantially at a tip end thereof, a thin membrane of substantially homogeneous metallic electrical resistance material the resistance of which is variable with temperature, said membrane having a relatively large ratio of surface area to cross section, means sealing said membrane with said tube in electrically-insulated relationship therewith and in closing relationship to the opening therethrough, and two electrical conductors each disposed within said tube and each electrically and mechanically secured to the interior surface of said membrane at a different one of two spaced positions therealong.

References Cited

UNITED STATES PATENTS

| | | | |
|---|---|---|---|
| 2,740,031 | 3/1956 | Addink | 73—262 |
| 2,816,997 | 12/1957 | Conrad | 338—30 |
| 2,818,482 | 12/1957 | Bennett | 338—30 |
| 2,961,625 | 11/1960 | Sion | 73—262 |
| 2,933,708 | 4/1960 | Elliot et al. | 338—28 |

REUBEN EPSTEIN, *Primary Examiner.*

U.S. Cl. X.R.

338—30; 73—362